June 6, 1967     C. A. SCHUNEMANN     3,323,910
ZINC RECOVERY
Filed Dec. 4, 1963
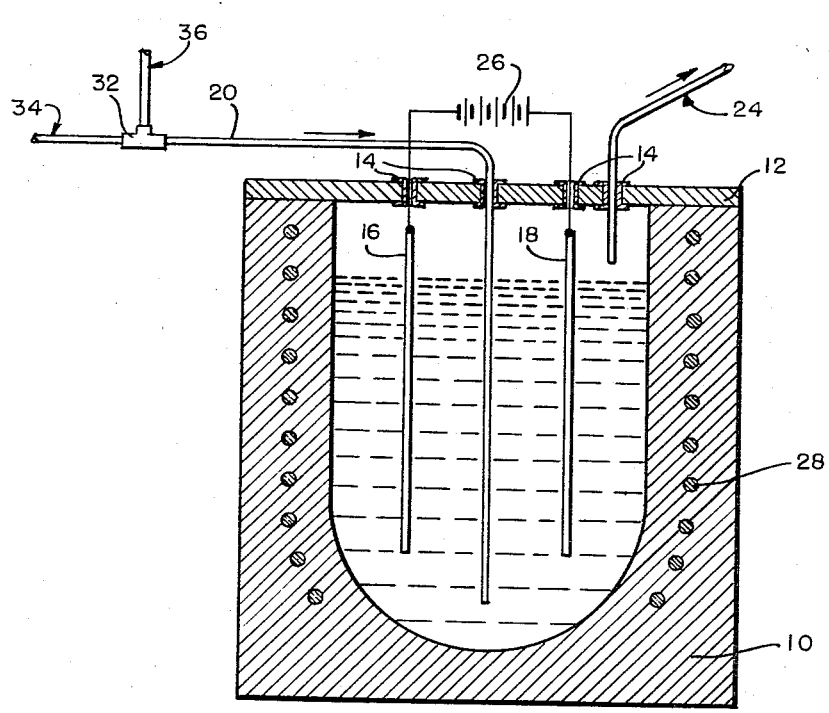
INVENTOR
Calvin A. Schunemann
BY Lawrence J. Field
ATTORNEY

United States Patent Office 3,323,910
Patented June 6, 1967

3,323,910
ZINC RECOVERY
Calvin A. Schunemann, Cleveland, Ohio, assignor to Horizons Incorporated, Cleveland, Ohio, a corporation of New Jersey
Filed Dec. 4, 1963, Ser. No. 328,076
7 Claims. (Cl. 75—86)

This invention relates to the preparation of high purity zinc metal from source materials in which zinc present in either elemental or combined form is associated with a substantial amount of metallic and non-metallic impurities which are difficult to separate from the zinc. More particularly it relates to a process whereby the zinc is recovered as metal of high purity from ores or other source materials containing substantial amounts of iron, aluminum or other metals other than the alkali and alkaline earth metals.

United States Patent 2,936,233, issued May 10, 1960, describes a process for producing zinc metal which comprises: simultaneously mixing and reacting (1) a basic material selected from the group consisting of lime, calcium carbonate, magnesia, dolomite, and mixtures thereof with (2) a zinciferous material having a substantial halide and oxide content and selected from the group consisting of zinc drosses, zinc residues, zinc skimmings and reducible zinc compounds, by dry grinding said materials together; maintaining the temperature below 500° C. while effecting an exothermic reaction between said materials during said dry grinding; introducing the resultant product into a melt consisting essentially of at least one molten alkaline earth halide; contacting the melt containing the introduced reacted starting material with a mixture of solid and gaseous carbonaceous reducing agents to reduce zinc oxide in said reacted material to metallic zinc; and recovering the metallic zinc from vapor evolved from the melt. The patented process has been found only moderately satisfactory for the recovery of zinc from ores or scrap containing large amounts of Fe, Mn, $SiO_2$, Al, Cu, Ni, since these materials tend to build up in the salt bath, although it is quite satisfactory for the handling of skimmings of the type described in the patent.

The non-volatile metallic portions of the feed, when present in normal amounts not exceeding a total of a few percent, present no particular problem in practical operation. However, when these non-volatile components are present in greater than normal amounts, the salt bath must be recycled very frequently leading to excessive processing costs. In addition, if a carefully controlled recycling is not used, ingredients such as iron and manganese tend to make the salt bath stiff and sluggish so that excessive temperatures are needed to maintain a bath of sufficient fluidity for easy purging.

A principal object of the present invention is to provide a process for the recovery of high purity zinc from raw materials such as ores containing substantial amounts of iron and manganese, and from die-cast scrap containing substantial amounts of nickel, iron, and manganese.

A typical analysis of such high-iron zinc ore is given in Table 1.

TABLE 1

*Analysis of mixed Canadian zinc ore*

| | Percent by weight |
|---|---|
| ZnS | 80.10 |
| FeS | 13.90 |
| CuS | 0.57 |
| PbS | 0.22 |
| CdS | 0.20 |
| MnS | 0.51 |
| CaO | 0.15 |
| $SiO_2$ | 0.10 |
| MgO | 0.22 |
| Acid insolubles | 2.18 |
| Miscellaneous and moisture | Balance to make 100 |

(80% of acid insolubles is $Al_2O_3$)

On roasting the ore of analysis given in Table 1 in air, a composition in accordance with that given in Table 2 is obtained.

TABLE 2

*Analysis of air roasted ore of Table 1*

| | Percent by weight |
|---|---|
| ZnO | 72.40 |
| $ZnSO_4$ | 5.75 |
| ZnS | 1.75 |
| $Fe_2O_3$ | 15.54 |
| CuS | 0.65 |
| PbO | 0.23 |
| CdO | 0.19 |
| MnO | 0.47 |
| CaO | 0.17 |
| $SiO_2$ | 0.11 |
| MgO | 0.25 |
| Acid insolubles | 2.49 |
| | 100.00 |

(80% of acid insolubles is $Al_2O_3$)

An analysis of die-cast skimmings of the type amenable to the present treatment is given in Table 3.

TABLE 3

*Zinc skimmings obtained from die-cast alloy*

| | Percent by weight |
|---|---|
| Zn metal | 32.9 |
| ZnO | 49.4 |
| $ZnCl_2$ | 9.3 |
| $Fe_2O_3$ | 1.7 |
| MnO | 0.6 |
| NiO | 1.2 |
| PbO | 1.7 |
| $Al_2O_3$ | 0.9 |
| Others | 2.3 |

A second object of the invention is the reduction or substantial elimination of the costly purging and recycling step characteristic of the above described patented process so as to permit the process to operate more or less continuously by continuous in-process removal of bath contaminants.

These and other objects are accomplished in a simple direct and economical process comprising the following sequence of steps:

(1) Charging a mixture of suitable alkaline earth salts and/or alkali metal salts into a suitable vessel;

(2) Applying heat to fuse the salt charge;

(3) Purging the system with argon or other inert gas (optional);

(4) Covering the vessel and inserting electrodes into the molten salt;

(5) Bubbling methane or other reducing gas into the melt to prepare the salt for the introduction of zinc containing materials;

(6) Charging roasted zinc-ore or other zinc-containing material into the melt;

(7) Electrolyzing the prepared melt, while continuing to sparge methane or other reducing gas into the melt; and (8) Recovering zinc from the vapor evolved during step (7).

An apparatus for carrying out the above described process is shown schematically in the single figure of the drawings, it being intended that the apparatus shown represents merely the essential elements and that numerous refinements known to those skilled in the metallurgical and electrochemical arts may be added thereto without departing from the intended scope of my invention.

In the apparatus, the vessel in which the process is conducted is a crucible 10, of graphite or other suitable material such as a dense grade aluminum oxide; crucible 10 is provided with a cover 12 made of nickel which may be securely fastened to the crucible. Cover 12 has gasketed (gaskets are 98% dense $Al_2O_3$) openings 14 through which extend a graphite anode 16 and a nickel cathode 18 and a conduit 20 for admitting gas into the crucible 10 as well as a charging funnel (not shown) through which solids may be charged into the crucible and also a flue 24 permitting vapors to be recovered from the process.

The crucible 10 provided with an adjustable heating means 28 whereby the contents of the crucible 10 may be maintained at any desired temperature or the crucible 10 may be heated in a separate furnace.

A source of potential 26 is connected to the anode and to the cathode.

The gas inlet conduit 20 is valved at 32 and separate branches 34, 36 connect conduit 20 with separate supplies to dry argon and reducing gas respectively. Means to preheat either of these gases may be provided.

The following examples will serve to further illustrate the invention.

EXAMPLE 1

A dry mixture consisting of 2238 parts by weight of calcium chloride and 85 parts by weight CaO was charged into crucible 10. The salt mixture was heated by heating means 28 to about 950° C., a temperature well above the melting point of the mixture of salts. After the mixture had reached temperature a stream of dry heated argon was introduced through branch 34 and conduit 20 to agitate the melt and to remove any moisture or other foreign vapors therefrom. This step is optional and need not be included when the salts are sufficiently free from moisture.

The cover 12 was then placed in position on the top of crucible 10, and a graphite anode rod 16 and a nickel cathode rod 18 were inserted through their openings in the cover. Obviously more than one anode or one cathode may be used if the size of the vessel 10 is such that it will accommodate more than one pair of electrodes. If desired the cover may be provided with "locks" to permit the insertion and withdrawal of electrodes into and out of the crucible without introducing any contaminants into the atmosphere within the apparatus, such means being well known in the art.

After the electrodes have been inserted, methane is sparged into the melt for 30 minutes, a flow of about 0.3 liter/min. being sufficient to bring the melt to the desired state of activity.

Then a charge consisting of an intimate mixture of 64 grams roasted ore of the analysis is shown in Table 2, 3 grams of carbon black and 1.5 grams of CaO was pressure fed by means of a screw feeder through the charging funnel and into the melt every hour. While the charge was being fed into the melt with a continuing flow of methane, a source of D.C. potential was applied to the electrodes at a voltage of 2.7 volts and an amperage of 3.5 amperes per square inch of cathode area, there being a total of 16 square inches of cathode area. Zinc metal vapors began to be evolved from the flue almost immediately after ore feeding was initiated and were condensed in an air cooled bag made of glass fiber cloth.

The process may be carried on either as a batch process or as a continuous process, depending on whether additional zinc-containing material is charged as the zinc is being evolved from the preceding charge. It becomes necessary to remove the cathode from time to time to remove the metals such as iron, copper, aluminum, i.e. those metals other than the alkali metals and alkaline earth metals and other than the readily volatilized metals, zinc, cadmium, bismuth, lead, tin and antimony—which have been deposited thereon. Prior to withdrawing the cathode, it is preferable to discontinue the flow of methane and to purge the system by reintroducing the flow of argon.

In the present example, a total of 512 grams of ore were fed into the reactor with periodic removal of the iron cathode and subsequent scraping for removal of the electrode deposit. A total of 89.6 grams of electrode deposit was obtained which was extracted with water leaving a magnetic metallic residue of 55.5 grams analyzing:

| | Percent |
|---|---|
| Fe | 81.60 |
| Cu | 4.75 |
| Si | 0.36 |
| Mn | 3.20 |
| Al | 6.12 |
| Zn | 3.03 |
| Others | 0.94 |

The salt remaining in the crucible (1906 grams) was analyzed with the following results:

| | | |
|---|---|---|
| Fe | percent | 0.48 |
| Si | | Trace |
| Cu | | Trace |
| Mn | | Trace |
| Al | percent | 0.08 |

Thus the material balance establishes that 98 to 99% of all the iron, manganese, aluminum and copper was accounted for with almost the entire content of these metals appearing on the cathode deposit. About 70% of the silica was removed in the cathode deposit but it is believed this low result is due to experimental error and that in fact, practically all the $SiO_2$ was removed (probably as metallic Si) in view of finding only a trace of $SiO_2$ in the bath. The Fe and Al contents of the bath represents either an equilibrium mixture or material present in the bath adventitiously due to cathode deposit being knocked off the cathode during its periodic removal and scraping.

The metallic zinc recovered from the filter bag was in the form of blue grey powder and weighed 305 g., 315 g. being the theoretical quantity if a 100% recovery had been achieved.

The analysis of the blue zinc thus obtained was as follows:

| | Percent by weight |
|---|---|
| Zinc | 99.0 |
| Aluminum | 0.002 |
| Lead | 0.11 |
| Cadmium | 0.04 |
| Iron | 0.04 |
| Silicon | 0.002 |

The relatively low zinc analysis in the face of the small amount of impurities is apparently due to the oxygen content of the metal which is responsible for the blue grey color. Such oxygen content is a result of the crude collection technique employed and would not be anticipated in a standard spalsh condenser, e.g. of the types described in United States Patents 2,457,546–551 issued Dec. 28, 1941, or improvements thereover.

EXAMPLE 2

1000 grams of zinc die-cast skimmings having the analysis set forth in Table 3, were dry ground with 45 g. of dead burned lime and 35 g. of petroleum coke and immediately placed in a closed forechamber serving as an introductory device to the screw feeder of the reaction vessel. 2000 grams of anhydrous calcium chloride was previously melted in the vessel 10 at 950° C. and the atmosphere above the vessel was purged of air and water vapor with argon. Methane at the rate of 0.3 liter per minute was fed into the molten calcium chloride through the sparger while the zinc die-cast skimmings batch was fed through the screw feeder at the rate of about 200 grams per hour. During such feeding, an electrolysis current of 8 amperes per square inch of cathode area (16 square inches of cathode area) was utilized and such conditions were maintained throughout the run without utilizing periodic removal and scraping of cathode deposit as defined in Example 1. Zinc vapor was produced within a few minutes after the initiation of the run and was collected in a fiber glass filter bag as before. Thirty minutes after the last addition of feed and with the electrolysis current still being maintained, the cathode with its attached deposit was carefully lifted from the bath but still retained under the cover of the crucible. The heating current, gas sparging, and electrolysis current were all shut off and the apparatus and its contents then allowed to cool overnight to room temperature.

After cooling, the cathode deposit was removed from the chamber and cracked off the nickel cathode rod and a total weight of 232.5 grams was recovered. This was leached in cold water, washed by decantation and filtration, dried and found to weigh 49.6 grams, having the following analysis:

| | Percent by weight |
|---|---|
| Fe | 22.7 |
| Mn | 9.2 |
| Ni | 18.8 |
| Pb | 25.6 |
| Al | 10.0 |
| Zn | 12.0 |
| Others | 2.7 |

The analysis indicates that in excess of 95% of all the Fe, Mn, Ni and Al had been removed from the bath as the cathode deposit and an amount of lead slightly in excess of 80% of the original skimmings analysis. The exact form in which the lead had deposited at the cathode was not ascertainable but at least a portion was in alloyed form.

After the bath itself was leached with water, 5.2 grams of small rounded spheres of metal were recovered whose analysis indicated they were chiefly a high lead zinc alloy. Evidently a portion of the lead had dropped off the cathode during its removal from the bath.

749 grams (771=theoretical) of blue grey zinc dust was recovered from the fiber glass filter bag and the product had the following analysis:

| | Percent by weight |
|---|---|
| Zn | 98.9 |
| Al | 0.001 |
| Pb | 0.07 |
| Cd | 0.003 |
| Fe | 0.01 |
| Ni | 0.005 |
| Si | 0.002 |

Again, as in Example 1, the relatively low zinc tenor may be explained on the basis of its oxygen content present as a consequence of the crude method of collection employed.

It will be seen that a simple and economcal process has been devised for the recovery of substantially pure zinc from zinc-containing materials in which the zinc is present in elemental metallic form, or as one or more compounds or intermetallic compounds or alloys, or in several of these forms, said process involving the vaporization or reduction and vaporization of the zinc from such materials, and that the process is particularly suitable to the recovery of zinc from complex ores of zinc and iron and from zinc residue in which substantial amounts, upwards of 1% by weight of the residue, is comprised of iron, nickel, manganese and/or aluminum.

Having now described the invention in accordance with the patent statutes it is not intended that it be limited by the foregoing descripion except as may be required by he appended claims.

I claim:

1. In a process for recovering zinc from zinc-containing source materials which comprises: melting a salt charge consisting of at least one halide salt selected from the group consisting of alkali metal halide salts and alkaline earth metal halide salts, in a refractory vessel; bubbling a reducing gas into the melt in order to condition the melt for the introduction of zinc-containing materials therein; and charging the zinc-containing material into the melt after it has been so prepared; the improvement which comprises: disposing at least one anode and at least one cathode in said melt; electrolyzing the melt to which said material has been added by impressing a D.C. potential between said anode and said cathode, while continuing to sparge reducing gas into the melt and while heating said melt to maintain the melt at a temperature sufficient for the melt to remain fluid and sufficient for zinc to evolve from said melt as a vapor under the prevailing conditions of temperature and pressure; removing said cathode from said melt and recovering the metals deposited thereon as a solid electrodeposit; and recovering zinc from the vapors evolved during said electrolysis.

2. In a process for recovering zinc from zinc-containing source materials contaminated with at least one nonvolatile metal selected from the group consisting of iron, manganese, aluminum, copper and nickel which process comprises: melting a charge comprising calcium chloride and calcium oxide in a refractory vessel; bubbling a hydrocarbon gas into the melt in order to condition the melt for the introduction of zinc-containing materials therein; and charging the zinc-containing material into the melt after it has been so prepared; the improvement which comprises: disposing at least one anode and at least one cathode in said melt; electrolyzing the melt to which said material has been added by impressing a D.C. potential between said anode and said cathode, while continuing to sparge said gas into the melt and while heating said melt to maintain the melt at a temperature sufficient for the melt to remain fluid and sufficient for zinc to evolve from said melt as a vapor under the prevailing conditions of temperature and pressure; removing said cathode from said melt and recovering a solid electrodeposit of at least one of said contaminant metals, from said cathode; and recovering zinc from the vapors evolved during said electrolysis.

3. The process of claim 2 wherein the zinc-containing material is mixed with a solid carbonaceous reducing agent and a small amount of alkaline earth oxide before it is charged into the melt.

4. The process of claim 2 wherein the reducing agent is methane.

5. In a process for recovering zinc from zinc rich source materials containing substantial amounts of iron, manganese and nickel which comprises: melting at least one alkaline earth metal halide salt in a refractory vessel; bubbling an inert gas into the melt in order to remove any moisture therefrom; then bubbling methane gas into the melt in order to condition the melt for the introduction of the zinc-rich source material into said melt; and charging the zinc-rich source material into the melt after it has been so prepared; the improvement which comprises: electrolyzing the melt to which said material has been added by applying a D.C. potential between at least one cathode and at least one anode immersed in said melt, while continuing to sparge reducing gas into the melt and while heating said melt to maintain the melt at a temperature sufficient for the melt to remain fluid and sufficient for zinc to evolve from said melt as a vapor under the prevailing conditions of temperature and pressure; removing said cathode from said melt and recovering the iron, manganese and nickel as a solid deposit electrodeposited on said cathode; and recovering zinc from the vapors evolved during said electrolysis.

6. In a process for recovering zinc from zinc skimmings obtained from melting a die-cast alloy, which comprises: melting a charge consisting of alkaline earth metal halide salt in a refractory vessel; bubbling a reducing gas into the melt in order to condition the melt for the introduction of the zinc skimming thereinto; and charging the zinc skimmings into the melt after it has been so prepared; the improvement which comprises electrolyzing the melt to which said skimmings have been added by applying a D.C. potential between at least one cathode and one anode immersed in said melt, while continuing to sparge reducing gas into the melt and while heating said melt to maintain the melt at a temperature sufficient for the melt to remain fluid and sufficient for zinc to evolve from said melt as a vapor under the prevailing conditions of temperature and pressure; intermittently removing said cathode electrode from said melt and recovering the metal deposited thereon; and recovering zinc from the vapors evolved during said electrolysis and deposition of metal impurities on said cathode.

7. The process of claim 6 wherein the zinc skimmings are mixed with carbon and lime before they are introduced into the salt melt.

References Cited
UNITED STATES PATENTS

| | | | |
|---|---|---|---|
| 814,810 | 3/1906 | Snyder | 204—66 |
| 2,936,233 | 5/1960 | Wainer | 75—86 |

JOHN H. MACK, *Primary Examiner.*

HOWARD S. WILLIAMS, *Examiner.*

G. KAPLAN, *Assistant Examiner.*